United States Patent [19]

Asrar

[11] Patent Number: 4,891,413
[45] Date of Patent: Jan. 2, 1990

[54] CYCLOPENTANE DIESTER VINYLENE POLYMERS

[75] Inventor: Jawed Asrar, Wilbraham, Mass.

[73] Assignee: Monsanto Company, St. Louis, Mo.

[21] Appl. No.: 303,171

[22] Filed: Jan. 27, 1989

Related U.S. Application Data

[63] Continuation-in-part of Ser. No. 54,656, May 27, 1987, abandoned.

[51] Int. Cl.$^4$ .............................................. C08F 24/00
[52] U.S. Cl. ................................... 526/269; 526/270; 526/281; 526/309; 526/318.43; 526/90
[58] Field of Search ............... 526/269, 270, 281, 309, 526/318.43, 90

[56] References Cited

FOREIGN PATENT DOCUMENTS 1550351  7/1967  France .................................. 526/90
1546775  5/1979  United Kingdom .

Primary Examiner—Joseph L. Schofer
Assistant Examiner—Alex H. Walker
Attorney, Agent, or Firm—Thomas E. Kelley; William J. Farrington; Richard H. Shear

[57] ABSTRACT

Polymers comprising units of diesters of cyclopentane diol vinylene prepared by metathesis ring opening polymerization of diesters of norbornene diol exhibiting a glass transition temperature of at least 100° C. are useful as engineering thermoplastics.

4 Claims, No Drawings

CYCLOPENTANE DIESTER VINYLENE POLYMERS

BACKGROUND OF THE INVENTION

This is a continuation-in-part of application Ser. No. 07/054,656, filed May 27, 1987, incorporated herein by reference now abandoned.

Disclosed herein are polymers comprising cyclopentane diester vinylene units and methods of making and using such polymers.

As used herein the term "norbornene dioxo" derivatives refers to monomers of the structural formula

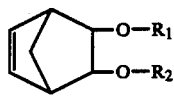

where $R_1$ and $R_2$ are independently hydrogen, an acyl, alkyl or aryl group or are a carbonyl, or other group.

As used herein, the term "cyclopentane diester vinylene" refers to polymer units of the structural formula

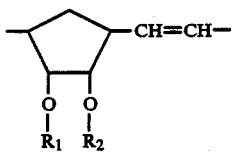

which can result from the metathesis ring opening polymerization of norbornene dioxo derivative monomers, e.g. norbornene diesters, where $R_1$ and $R_2$ are acyl. The term "endo" refers to the stereoisomer form of a monomer such as norbornene dioxocarbonyl in which the oxygen atoms and the double bond are both on the same side of the surface of the saturated five-membered ring of the monomer unit. Conversely, the term "exo" refers to the stereoisomeric form of such monomer units in which the oxygen atoms and the double bond are on opposite sides of the surface of the saturated five-membered ring of the monomer unit.

Feast et al. in *Journal of Molecular Catalysis*, 28, (1985) page 293, reported no success in preparing the homopolymer of the endo stereoisomer of norbornene dioxocarbonyl through metathesis ring-opening polymerization. Feast et al. did report limited success in copolymerizing norbornene with low levels (about 8%) of norbornene dioxocarbonyl and also speculated that the exo stereoisomer might be more readily polymerizable than the endo stereoisomer. In this regard it is believed that attempts to produce the exo stereoisomer by high temperature isomerization, e.g. by heating, will be generally unsuccessful with norbornene dioxocarbonyl because during such isomerization the shocksensitive, e.g. unstable, vinylene carbonate will be generated.

Milner in British Patent Specification No. 1,546,775 claims a variety of norbornene polymers including polymers having monomer units of norbornene diol. However, Milner teaches only the production of the polymer of the mono hydroxyl substituted norbornene by hydrolysis of the mono ester, i.e. polynorbornene acetate.

Ueda et al. in U.S. Pat. No. 4,166,083 state that the polymers of an acetic acid ester of 5-norbornene-2,3-diol can be prepared by methods disclosed by Michelotti et al. *J. Polymer Sci*, 3, 895-905 (1965) which is limited to teaching the polymerization of norbornene and chloromethyl norbornene. Michelotti et al. failed to polymerize norbornene nitrile. Since there is no teaching of a generalized polymerization procedure for norbornene derivatives, Ueda et al. do not provide any enablement for the polymer of the diester of norbornene diol.

McKeon et al. in U.S. Pat. No. 3,330,815 disclose polymers of a variety of bicyclo norbornene derivative monomer units, e.g. 5,6-dihydroxybicyclo[2.2.1]hept-2-ene (referred to herein as norbornene diol) and the diesters. Such polymers are produced through a vinyl-type addition polymerization and not a metathesis ring opening polymerization.

SUMMARY OF THE INVENTION

I have discovered that certain stereoisomer norbornene dioxo derivative monomers, i.e. diesters, can be polymerized by metathesis ring-opening polymerization to provide heat resistant thermoplastic polymers comprising diesters of cyclopentanediol vinylene. For instance the homopolymer comprising cyclopentane diacetate can exhibit a glass transition temperature of over 100° C. Such polymers are useful as engineering thermoplastic molding resins. Moreover, the ester groups can be subjected to de-esterification, e.g. in an alkaline environment, to provide a polymer having units of cyclopentane diol vinylene.

Thus, this invention provides novel polymers comprising units of diesters of cyclopentane diol vinylene of the structural formula

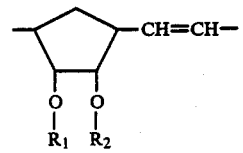

where $R_1$ and $R_2$ are an acyl group.

DETAILED DESCRIPTION OF THE INVENTION

Monomeric norbornene dioxocarbonyl can be hydrolyzed to norbornene diol, e.g. by use of a base such as potassium hydroxide. The norbornene diol is not readily polymerizable by metathesis ring opening methods since the hydroxyl groups are deleterious to commonly used tungsten catalysts. Norbornene diol can, however, be esterified, e.g. by reaction with a carboxylic acid, to provide a diester of norbornene diol such as norbornene diacetate. Such diesters of norbornene diol are readily amenable to metathesis ring opening polymerization to provide polymers comprising monomer units of the following structure:

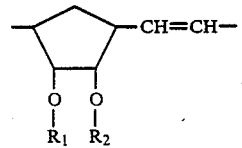

where $R_1$ and $R_2$ are acyl groups, e.g. acetate groups.

Metathesis ring opening polymerization is advantageously carried out at moderate temperatures, e.g. between about 25° C. and about 100° C. in a reaction medium comprising an aprotic solvent, e.g. chlorinated solvent such as dichloroethane, and which is devoid of water, alcohols, and the like which will readily deactivate common polymerization catalysts. Such catalysts are known in the art and are disclosed for instance in U.S. Pat. No. 3,959,234, incorporated herein by reference. A preferred catalyst comprises the reaction product of tungsten hexachloride and an acetal, e.g. 1,1-diethoxy ethane. Preferably, the polymerization reaction medium will also contain as an activator an aluminum alkyl such as diethyl aluminum chloride, triisobutyl aluminum or the like. Higher yields of precursor polymers of higher inherent viscosity have been achieved with triisobutyl aluminum as the activator. The polymerization reaction medium should be kept dry and free of contaminants, e.g. water, alcohols including diols, etc., that may interact with catalyst and/or activator to undesirably reduce the catalytic activity.

Alternatively, metathesis ring-opening polymerization is advantageously carried out as a bulk polymerization process which is especially useful for polymerization of diesters of norbornene diol. Bulk polymerization is effectively carried out at moderate temperatures, e.g. between about 25° C. and about 150° C. (depending on the melting temperature of the monomer), utilizing catalysts and activators as described above. Bulk polymerization can be carried out in a mold to form the polymer into a shaped article.

Polymers comprising units of diesters of cyclopentane diol vinylene are useful as engineering thermoplastics which can be formed into useful articles by conventional plastic forming techniques such as injection molding or casting from solution.

An advantageous application of the polymers of this invention is provided by the de-esterification S of such polymer to provide polymer comprising units of cyclopentane diol vinylene which is readily effected through the use of alkaline agents such as potassium hydroxide. Such de-esterification can be provided on the surface of articles comprising the diester polymer of this invention as a surface treatment to enhance barrier properties.

The following disclosure is provided to illustrate specific embodiments and aspects of the polymers of this invention but is not intended to imply any limitation of the scope o this invention. Temperatures are reported in degrees Celsius.

EXAMPLE 1

This example serves to illustrate the preparation of norbornene dioxocarbonyl.

12.4 ml of dicyclopentadiene, 52.8 g of vinylene carbonate, and 0.4 g hydroquinone were added to 12.4 ml of toluene in a Parr reactor. The mixture was held at about 160° for about 18 hours. The temperature was reduced to about 45° and the pressure reduced to about 5 mm to remove residual vinylene carbonate. Norbornene dioxocarbonyl was recovered at about 100% yield by raising the solution temperature to about 130°–140° and lowering the pressure to about 2 mm. Norbornene dioxocarbonyl, purified by recrystallization from carbon tetrachloride, exhibited a melting point of 114°–115°.

EXAMPLE 2

This example serves to illustrate the preparation of norbornene diol from norbornene didioxocarbonyl.

8 g of norbornene dioxocarbonyl, prepared as in Example 1, was dissolved in 120 ml of aqueous sodium hydroxide (12 g NaOH). The solution was refluxed for about 6 hours, held at room temperature for about 16 hours, neutralized with 10% HCl, and then saturated with sodium chloride. Norbornene diol extracted with ethyl ether exhibited a melting point of about 176°–177°.

EXAMPLE 3

This example serves to illustrate the preparation of norbornene diacetate from norbornene diol.

A solution of 11 grams of norbornene diol prepared as in Example 2 in 100 ml pyridine was cooled by dry ice. 45 ml of acetic anhydride was added to the cooled solution. The solution was held in the dry ice bath for about 30 minutes then allowed to sit at room temperature for about 16 hours, poured into an ice water slurry, extracted with chloroform and washed sequentially with 10% HCl, a saturated sodium bicarbonate solution, a sodium chloride solution, twice with water, then dried over sodium sulfate, and crystallized from a mixture of toluene and hexane to produce about 10 grams of norbornene diacetate.

EXAMPLE 4

This example serves to illustrate the polymerization of norbornene diacetate.

3 g of endo norbornene diacetate, prepared essentially as indicated in Example 3, was dissolved in 3 ml of 1,2dichloroethane to provide a monomer solution. 0.21 ml of 2.05 M diethyl aluminum chloride in heptane and 0.15 ml of 0.5 M catalyst solution (according to Example 3) were added to the monomer solution to provide a reaction solution which was maintained at room temperature for about 4 hours. Gelation was observed after about 40 minutes. After 4 hours the gel was dispersed by agitation in 15 ml of dichloroethane. Methanol was added to inactivate the catalyst and precipitate the resultant polymer (yield: about 97% based on monomer) which was dried in a vacuum oven. The polymer comprising units of cyclopentane diacetate vinylene exhibited a glass transition temperature (determined by differential scanning calorimetry) of 113° C.

EXAMPLE 5

This example serves to illustrate the preparation of polymers of cyclopentane diol vinylene.

Polymer comprising cyclopentane diacetate vinylene prepared essentially as indicated in Example 4 was dissolved in methylene chloride to provide a polymer solution. A film (about 0.1 mm thick) was cast from the polymer solution, dried, then immersed in 1 N sodium hydroxide solution for about 16 hours, washed with distilled water to pH 7, dried under vacuum and subjected to infrared spectroscopic analysis which indicated substantial conversion of diacetate groups to hydroxy groups.

While specific embodiments of the invention have been described, it should be apparent to those skilled in the art that various modifications thereof can be made without departing from the true spirit and scope of the invention. Accordingly, it is intended that the following claims cover all such modifications within the full inventive concept

What is claimed is:

1. A polymer comprising units of diester of cyclopentane diol vinylene of the formula

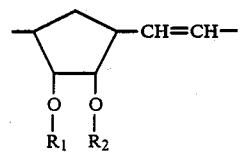

where $R_1$ and $R_2$ are acyl groups.

2. A polymer according to claim 1 in the form of an article having cyclopentane diol vinylene units on the surface thereof.

3. A polymer according to claim 1 having a glass transition temperature of at least 100° C.

4. A polymer according to claim 3 wherein said acyl groups are acetate groups.

* * * * *